(12) United States Patent
Kitahama et al.

(10) Patent No.: US 6,537,054 B2
(45) Date of Patent: Mar. 25, 2003

(54) APPARATUS FOR PRODUCING EXPANSION-MOLDED ARTICLE

(75) Inventors: Takashi Kitahama, Utsunomiya (JP); Masato Naito, Kanuma (JP); Ryo Kikusawa, Utsunomiya (JP)

(73) Assignee: JSP Corporation, Tokyo (JP)

( * ) Notice: Subject to any disclaimer, the term of this patent is extended or adjusted under 35 U.S.C. 154(b) by 0 days.

(21) Appl. No.: 09/764,355

(22) Filed: Jan. 19, 2001

(65) Prior Publication Data

US 2002/0009511 A1 Jan. 24, 2002

(30) Foreign Application Priority Data

Jan. 21, 2000 (JP) .................................. 2000-013238

(51) Int. Cl.$^7$ .............................................. B29C 44/30
(52) U.S. Cl. ..................... 425/224; 425/337; 425/371
(58) Field of Search ............................ 425/223, 224, 425/337, 371, 4 C; 264/175

(56) References Cited

U.S. PATENT DOCUMENTS

| 3,037,897 A | 6/1962 | Pelley ........................ 156/78 |
| 3,065,500 A | 11/1962 | Berner ....................... 425/4 R |
| 3,312,760 A | 4/1967 | Berner ....................... 264/51 |
| 3,383,441 A | * 5/1968 | Norrhede et al. ............ 264/51 |
| 3,408,690 A | 11/1968 | Jacob ......................... 425/4 R |
| 3,427,372 A | 2/1969 | Berner ....................... 264/51 |
| 3,471,610 A | 10/1969 | Sadek ........................ 264/321 |
| 3,501,558 A | 3/1970 | Munters et al. ............ 264/45.4 |
| 3,526,556 A | 9/1970 | Berner ....................... 156/79 |
| 3,594,461 A | 7/1971 | Jacob ......................... 264/51 |
| 3,674,387 A | 7/1972 | Gonon ........................ 425/4 R |
| 3,702,274 A | 11/1972 | Wooler ....................... 156/79 |
| 3,709,651 A | 1/1973 | Rivat-Lahousse ........... 425/4 R |
| 3,767,744 A | 10/1973 | Holl ........................... 264/51 |
| 3,773,876 A | 11/1973 | Rath et al. ................. 264/45.4 |
| 3,800,018 A | 3/1974 | Charpentier ................ 264/53 |
| RE27,964 E | 4/1974 | Berner ........................ 264/58 |

(List continued on next page.)

FOREIGN PATENT DOCUMENTS

| AT | WO 98/23426 | * 6/1998 | .......... B29C/39/16 |
| DE | 2029374 | 12/1971 | |
| DE | 27 12 413 | 9/1978 | |
| EP | 0988953 | 3/2000 | |
| JP | 59 042938 | 3/1984 | |
| JP | 09-104026 | 4/1997 | |
| JP | 09-104027 | 4/1997 | |
| JP | 2000-006253 | 1/2000 | |
| JP | 2000-015708 | 1/2000 | |
| JP | 2000 218635 | 8/2000 | |
| WO | WO 99/67471 | 12/1999 | |

*Primary Examiner*—Jan H. Silbaugh
*Assistant Examiner*—Joseph S Del Sole
(74) *Attorney, Agent, or Firm*—Sherman & Shalloway

(57) ABSTRACT

The invention relates to an apparatus for manufacturing expansion-molded articles continuously by conveying foamed beads into a heating region sandwiched between upper and lower belts. The apparatus has a belt that continuously travels along the upper inside face of a passageway, defined by structural members, whose cross-section constitutes an approximately rectangular shape and a belt that continuously travels along the lower inside face thereof. At least one of the upper and lower structural members that form the passageway is capable of movement in the vertical direction between the side-face structural members such that the thickness of the expansion-molded article can easily be varied. And at least one of the side-face structural members is capable of movement in the lateral direction between the upper and lower structural members such that the width of the expansion-molded article can easily be varied.

8 Claims, 3 Drawing Sheets

U.S. PATENT DOCUMENTS

| | | | |
|---|---|---|---|
| 3,832,106 A | 8/1974 | Rivat-Lahousse | 425/4 R |
| 3,832,429 A | 8/1974 | Charpentier | 264/51 |
| 3,853,972 A | 12/1974 | Berner | 264/53 |
| 3,863,908 A | 2/1975 | Charpentier | 264/45.5 |
| 3,888,608 A | 6/1975 | Holl | 425/4 C |
| 3,895,086 A | 7/1975 | Berner | 264/45.4 |
| 3,904,336 A * | 9/1975 | Axer et al. | 425/115 |
| 3,971,838 A | 7/1976 | Yazawa | 264/51 |
| 3,986,918 A | 10/1976 | Berner | 156/497 |
| 3,992,501 A | 11/1976 | Tatzel et al. | 264/126 |
| 3,994,648 A | 11/1976 | Kornylak et al. | 425/150 |
| 4,076,782 A | 2/1978 | Kubo | 264/51 |
| 4,252,515 A * | 2/1981 | Meunier et al. | 425/224 |
| 4,279,847 A | 7/1981 | Assarsson et al. | 264/51 |
| 4,352,895 A | 10/1982 | Hilterhaus | 521/99 |
| 4,379,107 A | 4/1983 | Berner | 264/51 |
| 4,417,932 A | 11/1983 | Breitscheidel et al. | 156/62.2 |
| 4,432,713 A | 2/1984 | Berner | 425/4 C |
| 4,824,354 A * | 4/1989 | Keaton | 425/345 |
| 5,091,133 A | 2/1992 | Kobayashi et al. | 264/119 |
| 5,968,430 A | 10/1999 | Naito et al. | 264/126 |
| 6,005,014 A * | 12/1999 | Blackwell et al. | 521/79 |
| 6,045,350 A | 4/2000 | Cretti | 425/364 R |
| 6,077,875 A | 6/2000 | Sasaki et al. | 521/60 |
| 6,343,924 B1 * | 2/2002 | Klepsch | 425/223 |

* cited by examiner

APPARATUS FOR PRODUCING EXPANSION-MOLDED ARTICLE

BACKGROUND OF THE INVENTION

1. Field of the Invention

The present invention relates to apparatus for producing expansion-molded articles. In particular, it relates to apparatus for producing expansion-molded articles capable of producing expansion-molded articles continuously by thermal expansion of synthetic resin foamed and expanded beads (hereinafter to be referred to as "foamed beads") and mutually fusion-bonding these foamed beads.

2. Description of the Related Art

As methods of molding foamed beads to a prescribed shape by fusion-bonding these beads by expanding them by heating, there are known a method in which the foamed beads are packed into a metal mold, and molded while heating with steam (hereinbelow, this method of molding is termed a batch molding method), and a method wherein the foamed beads are continuously molded by being passed through a heating region while being fed between upper and lower belts (hereinbelow such a method of molding is termed a continuous molding method). Compared with the batch molding method, the continuous molding method has the advantages that expansion-molded articles (hereinbelow expansion-molded articles may be abbreviated to molded articles) can be manufactured continuously and that molded articles of long dimensions can be obtained; as a method of continuously molding polystyrene resin foamed beads, for example the method disclosed in published Japanese Patent Number Sho. 52-2424 is known. Also, as methods of continuously molding polyolefin resin foamed beads, the methods of Laid-open Japanese Patent publication number Hei. 9-104026, Laid-open Japanese Patent publication number Hei. 9-104027, Laid-open Japanese Patent publication number 2000-6253, Laid-open Japanese Patent publication number 2000-15708 and U.S. Pat. No. 5968430 previously applied for by the present applicants are known.

However, conventional apparatus for manufacturing expansion-molded articles used in the method of continuous molding described above is constructed such that foamed beads are supplied between continuously traveling belts along upper and lower surfaces within a passageway whereof the cross-section defined by the structural members constitutes an approximately rectangular shape, these foamed beads being expanded by heating while they are fed in a heating region and these foamed beads being mutually fusion-bonded; so when it is desired to alter the thickness or width of the expansion-molded article which is to be obtained, it is necessary to replace the belt and/or structural members by ones of different width; i.e. there is the problem that every time the width or thickness of the expansion-molded article that is manufactured is changed, a complicated operation of changing the belt or structural members is necessary, and belts or structural members of a number depending on the differences in width and/or thickness of the molded articles must be provided beforehand, so that the cost of the apparatus is considerable.

SUMMARY OF THE INVENTION

In view of the above, an object of the present invention is to provide apparatus for producing expansion-molded articles wherein the thickness and/or width of the molded articles that are to be manufactured can easily be altered. (Means for Solving the Problem)

Specifically, an apparatus according to the present invention for manufacturing expansion-molded articles comprises a belt that continuously travels along the upper inside face of a passageway, defined by structural members, whose cross-section constitutes an approximately rectangular shape and a belt that continuously travels along the lower inside face thereof, in which foamed beads are continuously molded by successively passing foamed beads supplied between these upper and lower belts through a heating region and cooling region sandwiched between the belts, in which at least one of the upper and lower structural members that form the passageway is constituted so as to be capable of movement in the vertical direction sandwiched between the side-face structural members and comprises means for adjusting the thickness of the expansion-molded article by moving vertically at least one of the upper and lower structural members constituted so as to be capable of movement.

Also, a further apparatus according to the present invention for manufacturing expansion-molded articles comprises a belt that continuously travels along the upper inside face of a passageway, defined by structural members, whose cross-section constitutes an approximately rectangular shape and a belt that continuously travels along the lower inside face thereof, by continuously molding foamed beads by successively passing foamed beads supplied between these upper and lower belts through a heating region and cooling region sandwiched between the belts, in which at least one of the side-face structural members that form the passageway is constituted so as to be capable of movement in the lateral direction sandwiched between the upper and lower structural members and comprises means for adjusting the width of the expansion-molded article by moving in the lateral direction at least one of the side-face structural members constituted so as to be capable of movement.

Preferably the apparatus for manufacturing expansion-molded articles according to the invention comprises sealing means for preventing leakage of heating steam at the location of contact of the movably constituted structural member(s) and the structural members that sandwich the movably constituted structural member(s). According to the present invention, the movably constituted structural member(s) may be supported on a shaft(s) that is/are reciprocated by rotation of a screw(s). Or the movably constituted structural member(s) may be supported by a rod(s) of a cylinder(s).

Preferably the apparatus for manufacturing according to the present invention comprises belts that respectively continuously travel along the inside face of the side-face structural members. Preferably the belts that move along the inside faces of the side-face structural members are provided extending from the commencement of the heating region to the end of the cooling region.

The apparatus for manufacturing according to the present invention embraces apparatus wherein means for adjusting the angle of inclination of the belt on the upper side in the region of supply of the foamed beads are provided on the upper belt. Also it embraces apparatus wherein projections are provided in the vicinity of the inlet of the passageway.

DESCRIPTION OF THE PREFERRED EMBODIMENTS

An embodiment of the present invention is described below with reference to the drawings.

Figure 1:
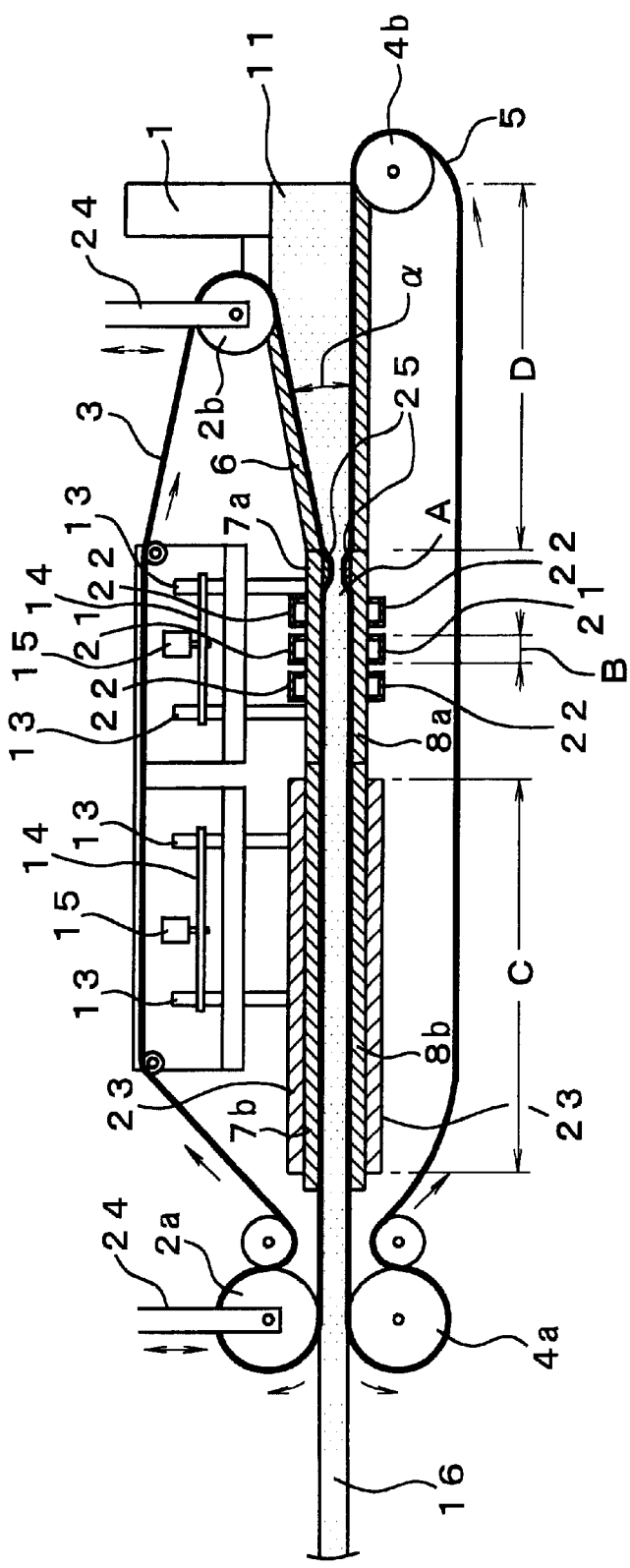
FIG. 1 is a partly cross-sectional diagram illustrating an embodiment of apparatus according to the present invention.

FIG. 1 shows an example of apparatus for producing expansion-molded articles according to the present invention, this molding apparatus comprising: a hopper 1 for storing foamed beads, a belt 3 that travels continuously in endless fashion between upper rolls 2a, 2b, and a belt 5 that travels continuously in endless fashion between lower rolls 4a, 4b. The foamed beads 11 that are supplied from hopper 1 move sandwiched by belts 3 and 5 through a passageway A and are expanded by being heated by steam in heating region B; thus the beads are mutually fusion-bonded and are then cooled in cooling region C to obtain the molded article.

In the above molding apparatus according to the present invention, upper roll 2a and lower roll 4a perform drive rotation, while upper roll 2b and lower roll 4b are arranged such that upper belt 3 and lower belt 5 slide over the circumferential surfaces of these respective rolls 2b, 4b without these rotating. Slidability at these surfaces is improved by the provision of slide comprising polytetrafluoroethylene (Teflon) or the like at the surfaces of rolls 2b and 4b that contact the belts. Upper roll 2b is constituted such that its position can be moved vertically by drive means 24, the arrangement being such that the angle of inclination α of the upper belt 3 in the foamed bead supply region D can be altered by moving upper roll 2b vertically. 6 is an auxiliary plate, this auxiliary plate 6 being constituted such that its angle with belt 3 changes when the angle of inclination α of upper belt 3 is adjusted. Also, upper roll 2a is moved vertically by drive means 24, the arrangement being such that its separation between upper roll 2a and lower roll 4a can be adjusted in accordance with the thickness of molded article 16.

In the above apparatus, the foamed beads supplied from hopper 1 are sandwiched between belts 3 and 5, and are fed into passageway A having a space section of approximately rectangular cross-section defined by upper and lower structural members 7a, 7b, and 8a, 8b and side-face structural members 9 and 10 (FIG. 2); the arrangement is such that the belt 3 and the belt 5 travel between the structural members 7a, 7b and 8a, 8b in this passageway A. On the upper structural member 7a and the lower structural member 8a, there are respectively provided a steam supply unit 21 and a suction unit 22 upstream and downstream of this steam supply unit 21. It is not essential to provide these suction units 22, but it is preferably to do so. On the upper structural member 7b and the lower structural member 8b, there are respectively provided cooling means 23.

Figure 2:
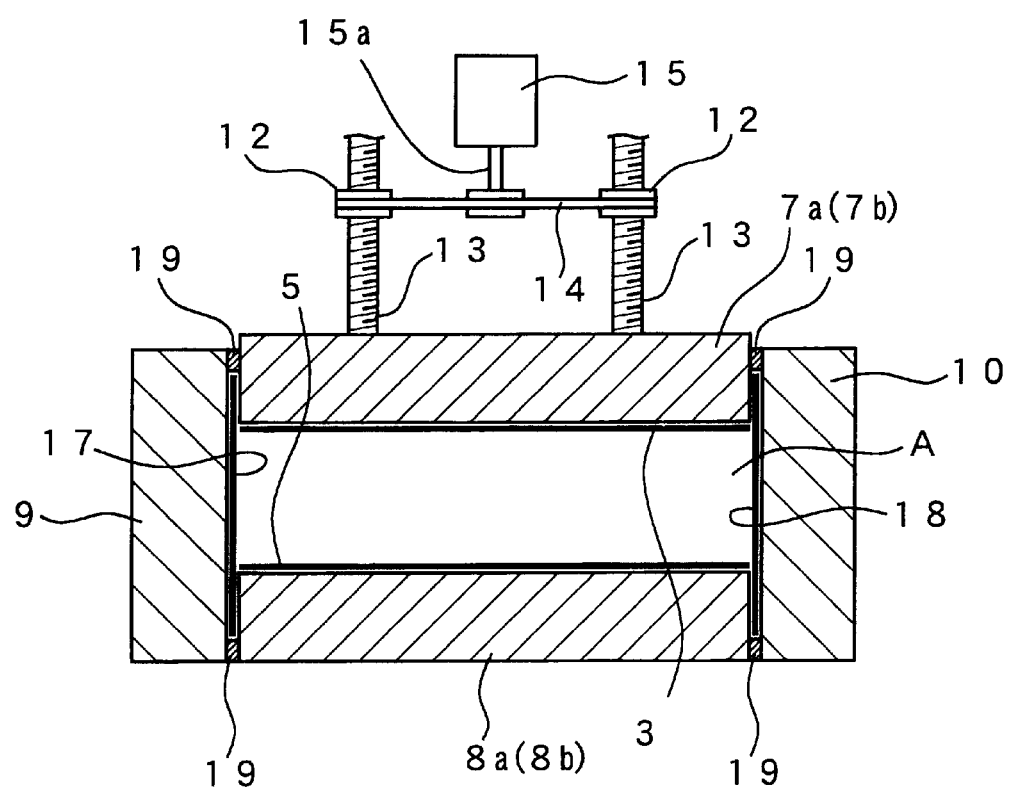
FIG. 2 is a cross-sectional diagrammatic view illustrating a mechanism for adjusting molded article thickness in apparatus according to the present invention.

The structural members 7a, 7b, 8a, 8b, 9, 10 and auxiliary plate 6 are made of metal material such as aluminum board, plate or plank; slide such as Teflon, not shown, is mounted on their faces on the sides contacting belts 3, 5 so as to facilitate sliding of belts 3, 5. It should be noted that the continuously traveling belts could be provided not merely above and below but also at both side faces; if continuously traveling belts 17, 18 are provided in endless fashion on the inside faces of side-face structural members 9. 10 at both sides as shown in FIG. 2, the shape and the appearance of the side face portions of the molded article 16 obtained can be improved. If belts 17, 18 are provided on the inside faces of side-face structural members 9, 10, it is preferable that these belts 17, 18 should be provided extending at least from the commencement of heating region B to the end of cooling region C.

The upper structural members 7a, 7b and lower structural members 8a, 8b are provided sandwiched between the side-face structural members 9 and 10, upper structural members 7a, 7b being supported on shafts 13 shaped malescrew that are reciprocated vertically by the rotation of female screws 12. Screws 12 are connected with the shafts 15a of motors 15 by for example belts 14 so that the rotation of motors 15 is transmitted to screws 12 and when screws 12 rotate the rotary movement of screws 12 is converted into vertical movement of shafts 13, causing the upper structural members 7a, 7b that are supported on shafts 13 to be moved vertically. As the result, the height of passageway A can be changed in accordance with the thickness of the molded article 16 that is to be obtained.

In regard to the upper structural members 7a, 7b, it is necessary that the bottom end edges of the side faces of these structural members 7a, 7b should move vertically within a range such that they do not depart from the positions of side-face structural members 9, 10, but, if belts 17, 18 are also provided at the side faces, it is preferable that the bottom end edges of structural members 7a, 7b should be moved vertically within a range such that they do not depart from the upper end edges of belts 17, 18. Also, in order to prevent leakage of steam from the joints between the upper and lower structural members and the side-face structural members it is desirable to provide sealing members 19 at the joints. Preferably a sealing member 19 is provided at the region of contact of at least movably arranged upper structural members 7a, 7b and side-face structural members 9, 10; preferably a sealing member 19 is mounted on the upper ends on the inside face of side-face structural members 9, 10 which do not move. As for the sealing member 19, a synthetic rubber with high heat resistance such as a silicon rubber is preferably used.

In the above embodiment, the case was illustrated in which only the upper structural members 7a, 7b were arranged to be vertically movable, but an arrangement would be possible in which only the lower structural members 8a, 8b, or both the upper structural members 7a, 7b and the lower structural members 8a, 8b were arranged to be vertically movable. Also, as the means for moving the structural members, any means that is capable of moving the structural members could be employed: there is no restriction to a method in which the structural members are supported by shafts 13 which are reciprocated by rotation of screws 12; for example, movement could be effected by a hydraulic cylinder or the like linked to the structural members. Although in the above example, the upper structural members consist of two plate type structural members 7a and 7b, and the lower structural members consist of two plate type structural members 8a and 8b, both upper and lower structural members could respectively consist of three or more plate type structural members. Moreover, if they are movable vertically, both upper and lower structural members could respectively consist of one plate type structural member.

Figure 3:
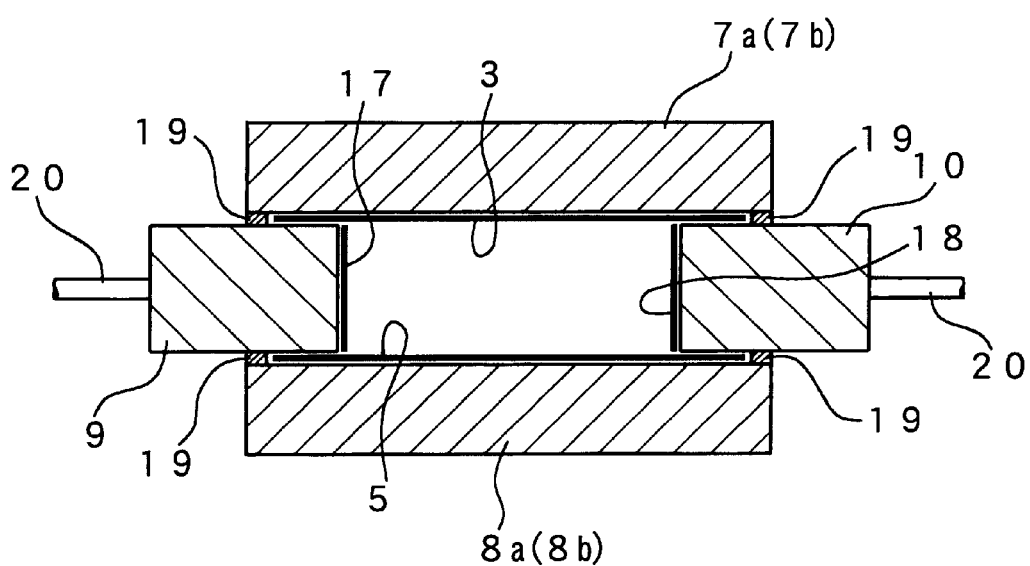
FIG. 3 is a cross-sectional diagram illustrating a mechanism for adjusting molded article width, illustrating another embodiment of the present invention.

Although, in the manufacturing apparatus according to the invention described above, the case was described in which the thickness of the molded article 16 was arranged to be variable by moving the upper structural members 7a, 7b vertically, it would also be possible to alter the width of molded article 16 sought to be obtained by adopting a construction whereby for example cylinder rods 20 are connected to the side-face structural members 9, 10 as shown in FIG. 3, so that the side-face structural members 9, 10 can be moved in the lateral direction and fixed in a position that may be chosen at will while being sandwiched between the upper structural members 7a, 7b and the lower structural members 8a, 8b. In this case also, it is desirable to provide sealing members 19 at the location where side-face structural members 9, 10 are constituted so as to be movable and upper and lower structural members 7a (or 7b) and 8a (or 8b) make contact in order to prevent leakage of steam. It is more preferable to provide the sealing members 19 at the both ends on the inner face side of the upper structural members 7a, 7b and the lower structural members 8a, 8b that do not move.

When the side-face structural members are constituted so as to be capable of movement in the lateral direction, as shown in FIG. 3, it could be arranged for only either one of structural members 9 and 10 to be capable of movement rather than both the side-face structural members 9 and 10 being constituted so as to be capable of movement. Also, if required, both side-face structural members 9 and 10 could respectively consist of two or more plate type structural members. Also, the means for moving the side-face structural members 9 and 10 is not restricted to a cylinder as described above and any desired means could be adopted.

As the base resin of the foamed beads that can be used to manufacture the molded article using the apparatus according to the present invention, a thermoplastic resin can be used, especially a polyolefin resin with at least 50 mol % olefin unit constituents is preferable, such as a homopolymer of olefins such as polyethylene, polypropylene or polybutylene, a copolymer of olefins such as ethylene-butene random copolymer, ethylene-hexene random copolymer, ethylene-octene random copolymer, ethylene-propylene block copolymer, ethylene-propylene random copolymer, ethylene-propylene-butene random copolymer, or a graft polymer obtained by graft polymerization by impregnating a homopolymer of the above polyolefins or a copolymer of olefins with styrene or reactive vinyl monomer such as acrylic acid monomer. These resins may be suitably mixed when used. These resins may be employed as uncrosslinked, or in a crosslinked state.

Next, a method of manufacturing a molded article using the apparatus according to the present invention will be described.

First of all, the upper structural members 7a, 7b and upper roll 2a are moved into position in accordance with the thickness of the molded article 16 that is desired to be obtained. Foamed beads 11 supplied from hopper 1 are fed in the direction of the heating region B sandwiched between the belts 3 and 5. If the foamed beads are polyolefin resin foamed beads, preferably the angle of inclination α of belt 3 is adjusted such that the foamed beads are compressed to a bulk volume of 40 to 95% of their original bulk volume, whilst the foamed beads supplied from hopper are being fed towards the heating region B. Preferably when the polyolefin resin foamed beads are molded, the angle of inclination α of the inclined upper belt 3 is normally less than 10° and even more preferably is 1 to 5°.

Although the foamed beads fed into heating region B are heated by the steam that is injected into passageway A from steam supply unit 21, the provision of a suction unit 22 for sucking up steam or steam drainage both upstream and downstream of steam supply unit 21 can prevent accumulation of such steam drainage in passageway A from interfering with the supply of foamed beads (in particular, the action of a suction unit 22 on the upstream side of steam supply unit 21), or can prevent problems such as generation of warping in the molded article caused by reduction in the cooling effect of the molded article due to this steam drainage (in particular, the action of a suction unit 22 on the downstream side of steam supply unit 21). Instead of providing suction units 22 both above and below the passageway, it would be possible to provide these exclusively below passageway A, with the object of removing drainage accumulated below passageway A. In order to make it possible to supply steam into passageway A from steam supply unit 21 or to suck out by means of suction unit 22 steam or steam drainage supplied into passageway A, it is necessary that belts 3 and 5 should have steam permeability. Usually stainless-steel belts of thickness about 0.2 to 1.0 mm formed with a large number of through-holes of diameter 0.5 to 3.0 mm with pitch of about 10 to 50 mm are employed.

The steam is supplied into passageway A from steam supply unit 21 through the through-holes of the upper and lower structural members 7a, 8a and/or through-holes provided in belts 3, 5. The pressure of the steam supplied from steam supply unit 21 is usually 9.8 to 39.2 N/cm$^2$ G.

The foamed beads that are heated by steam are expanded with the result that the mutual gaps between beads in passageway A are filled and the beads are mutually fusion-bonded to form a molded article (at this time point, its condition is not what might be called a complete molded article, but, since mutual fusion between the foamed beads has occurred, it will for convenience be referred to as a molded article), after which they are conveyed into cooling region C equipped with cooling means 23. As cooling means 23, for example a cooling plate in which cooling water circulation pipes are inserted may be employed. The above steps are repeated continuously to obtain an elongate molded article 16.

Although not specially shown in the drawings, steam supply units 21, suction units 22 and cooling means 23 need not be provided exclusively on the side of the upper and lower structural members 7a, 7b, 8a, 8b, but could also be provided on the side of side-face structural members 9 and 10. In the above example, the case was illustrated in which only a single set of steam supply units 21 was provided, above and below; however, the steam supply units need not necessarily be only a single set: two or more sets thereof could be provided. If for example two sets of steam supply units are provided, it is preferred that steam of a temperature capable of effecting expansion of the foamed beads but little or no fusion of the foamed beads surface is supplied from the steam supply unit on the upstream side, thereby heating and expanding the foamed beads, after which, steam of a temperature enough to effect fusion of the foamed beads surface is supplied from the steam supply unit on the downstream side, thereby causing the expanded foamed beads to mutually fusion-bond. If polyolefin resin foamed beads are employed as foamed beads 11, as disclosed in U.S. Pat. No. 5,968,430, it is desirable to provide projections 25 in the vicinity of the inlet of passageway A, so that, after compressing the foamed beads 11 between these projections 25, a part or the whole of the compression is removed before they are passed through the heating region to be molded. Preferably, between projections 25, the foamed beads are compressed to a bulk volume of 10 to 60% of their original bulk volume. In this way, back-flow of foamed beads and leakage of steam can be largely prevented.

Although, in the above description, a molded article 16 of constant thickness can be obtained, if it is desired to obtain molded articles of different thickness, this can be achieved by molding as described above after moving upper structural members 7a, 7b and upper roll 2a in accordance with the thickness of the molded article that is sought to be obtained.

Also, if molded articles of different width are to be obtained, as shown in FIG. 3, these can be molded using apparatus in which the side-face structural members 9 and 10 are made movable in the lateral direction.

As described above, with the apparatus according to the present invention, elongate molded articles can be obtained which could not be obtained by the batch system. Also, with apparatus according to the present invention, even when molded articles of different thickness and width are to be obtained, this can easily be coped with, and molded articles of different thickness or width can be manufactured efficiently.

What is claimed is:

1. An apparatus for manufacturing expansion-molded articles comprising,
    a first substantially rectangular passageway and a second substantially rectangular passageway defined by a first and second set of structural members,
    said first passageway having a heating region and said second passageway having a cooling region,
    a first endless belt continuously traveling along a first and second upper inside face of said first and second passageway,
    a second endless belt continuously traveling along a first and second lower inside face of said first and second passageway,
    said first set of structural members comprising a first upper structural member defining said first upper inside face, a first lower structural member defining said first lower inside face and a set of side-face structural members,
    at least one of said first upper and lower structural members being mounted for movement in a vertical direction between said side-face structural members whereby the depth of said first passageway is adjustable,
    said second set of structural members comprising a second upper structural member defining said second upper inside face, a second lower structural member defining said second lower inside face and said set of side-face structural members,
    at least one of said second upper and lower structural members being mounted for movement in a vertical direction between said set of side-face structural members whereby the depth of said second passageway is adjustable,
    and a first means for moving said first upper and lower structural members and a second means for moving said second upper and lower structural members, whereby expansion moldable material is successively passed through said heating region and said cooling region of said passageway by said belts to form an expansion-molded article wherein the thickness of said article is controlled by said first and second means for moving.

2. The apparatus of claim 1 further comprising sealing means at the location of contact between said first upper structural member and said side-face structural members and/or first lower structural member and said side-face structural members whereby leakage of heat from said heating region is prevented.

3. The apparatus of claim 1 wherein both said first upper or lower structural members and said second upper or lower structural members are supported on a shaft that is reciprocated by rotation of a screw.

4. The apparatus of claim 1 wherein both said first upper or lower structural members and said second upper or lower structural members are supported by a rod of a cylinder.

5. The apparatus of claim 1 further comprising endless belts continuously traveling along the inside face of said side-face structural members.

6. The apparatus of claim 5 wherein said belts along said side-face structural members are provided extending from the commencement of said heating region to the end of said cooling region.

7. The apparatus of claim 1 further comprising means for adjusting an angle of inclination for said first upper belt in a region of supply of said expansion-moldable material.

8. The apparatus of claim 1 wherein projections are provided at an inlet portion of said first passageway.

* * * * *